Aug. 6, 1968   H. S. BEST ET AL   3,395,844
PILLAR ATTACHMENT MACHINE
Filed Sept. 8, 1966   5 Sheets-Sheet 1

INVENTORS
HOWARD S. BEST
BENJAMIN TITOW
BY Sughrue, Rothwell,
Mion, Zinn &
Macpeak
ATTORNEYS

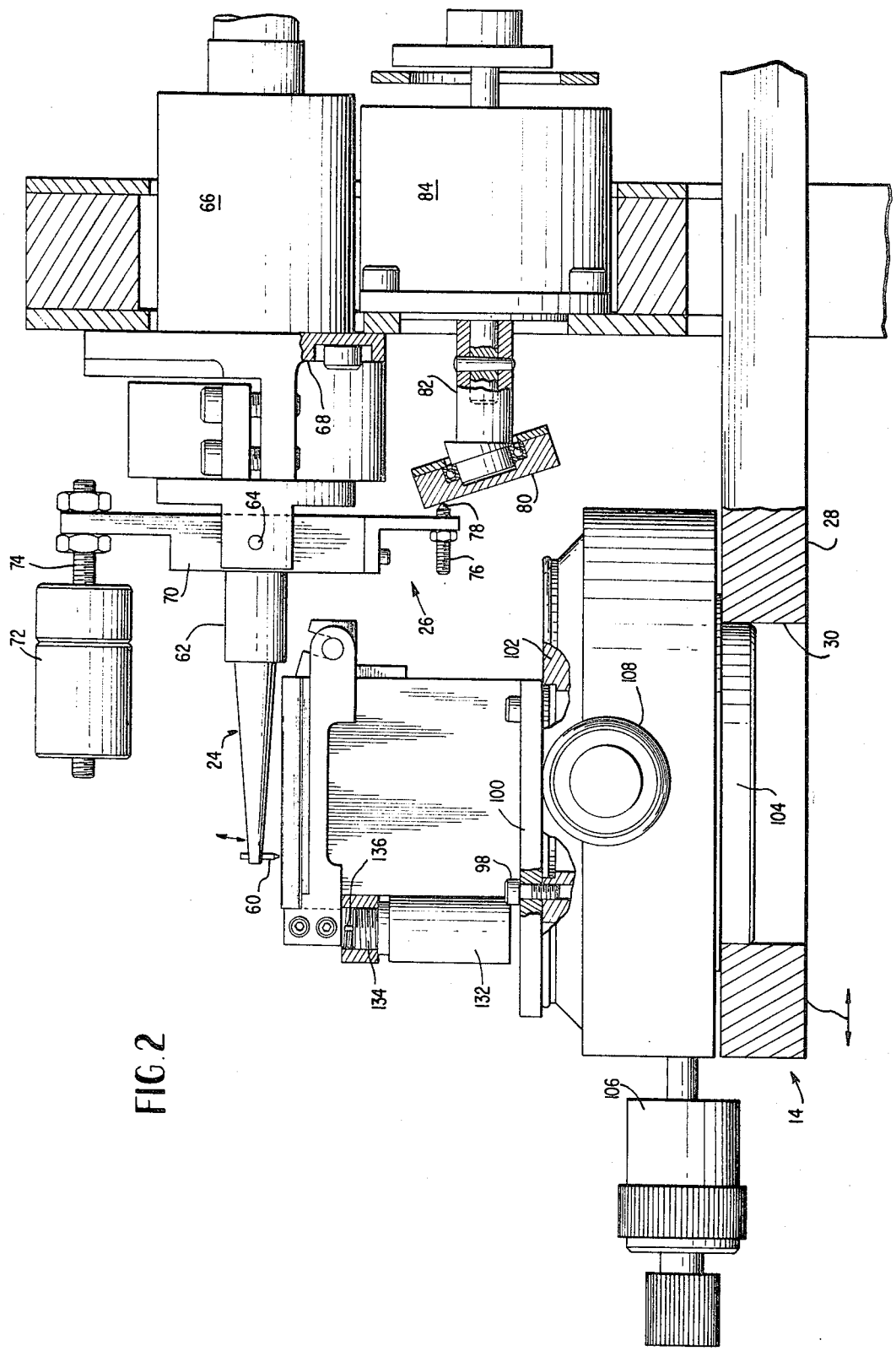

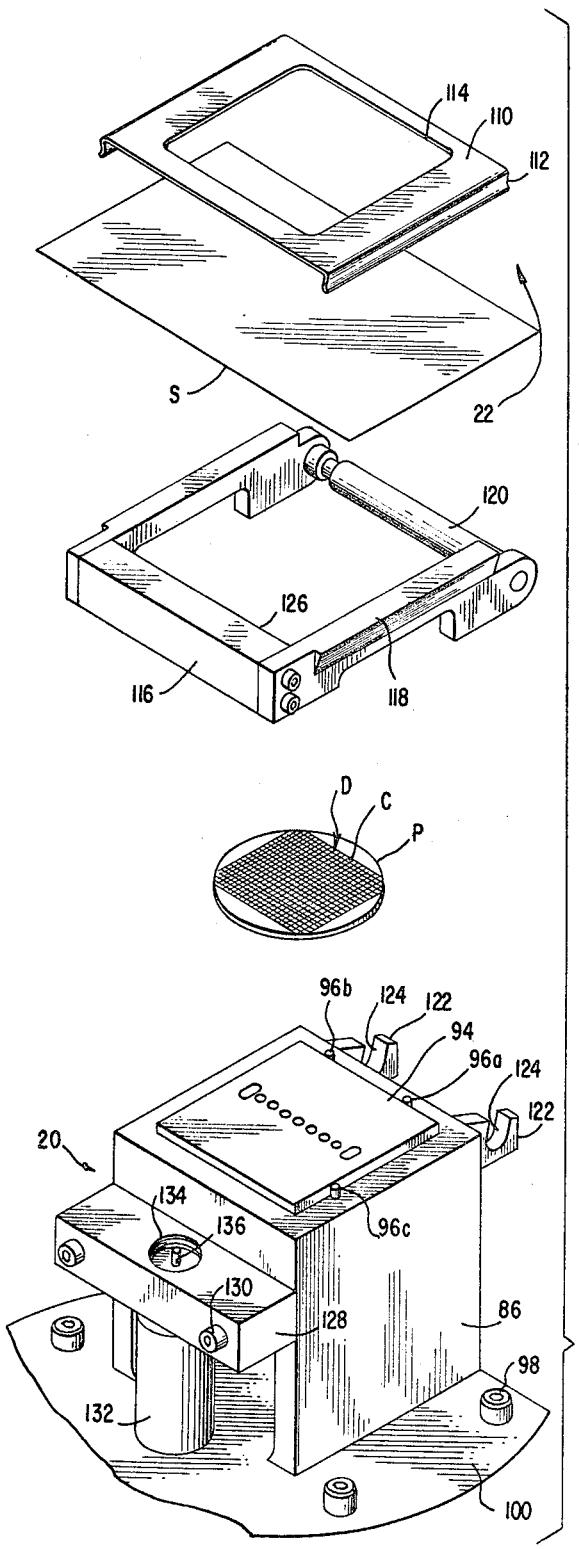
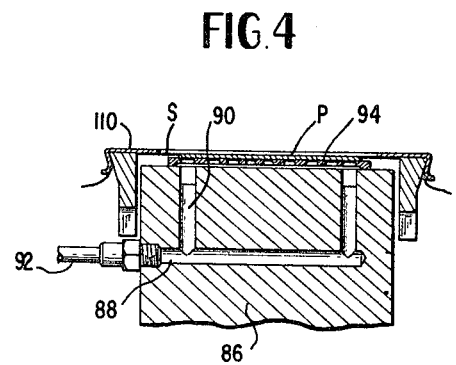
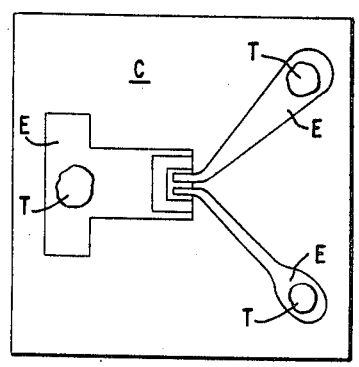

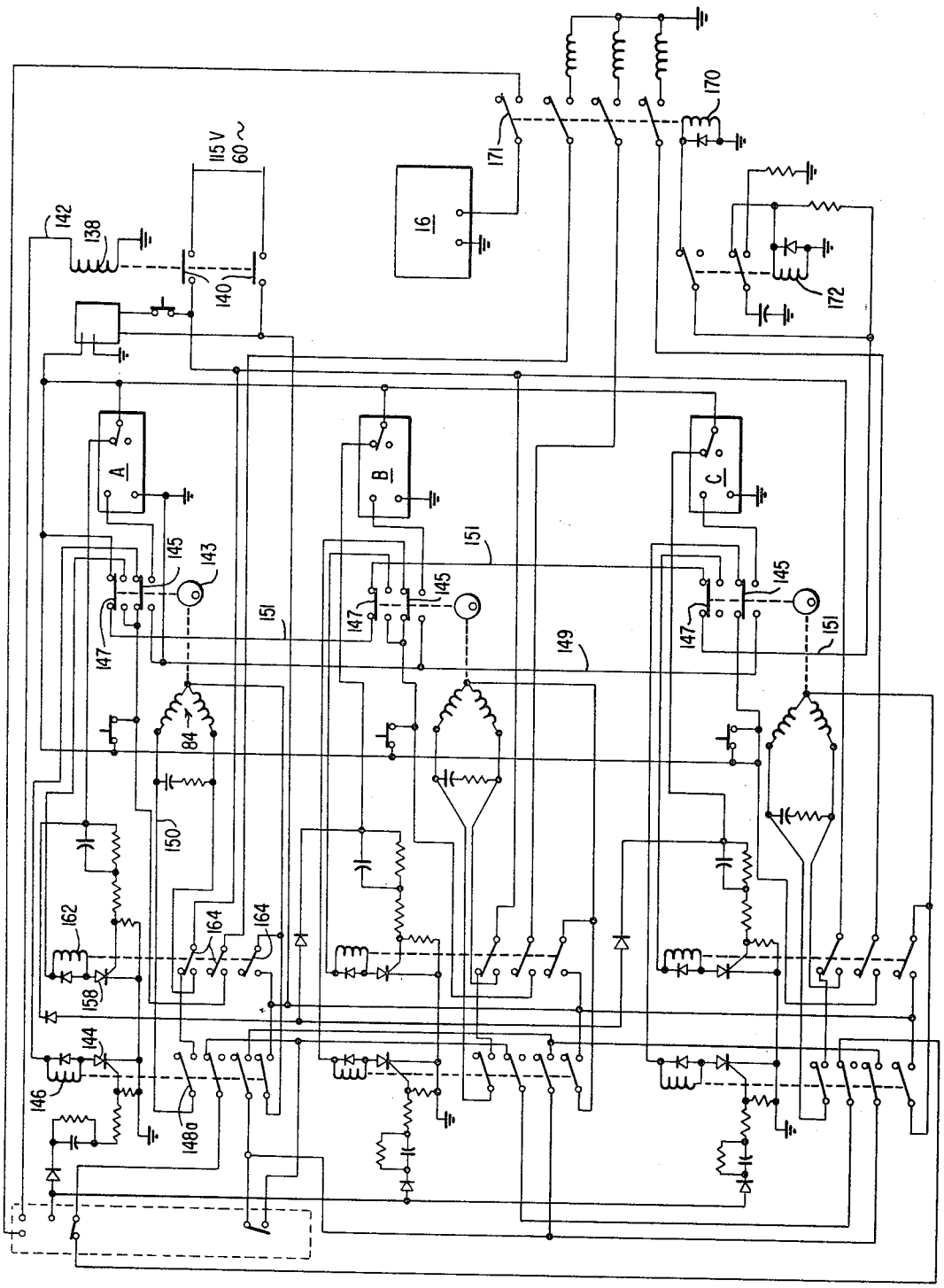

United States Patent Office 3,395,844
Patented Aug. 6, 1968

3,395,844
PILLAR ATTACHMENT MACHINE
Howard S. Best, Raleigh, N.C., and Benjamin Titow, West Hempstead, N.Y., assignors to Corning Glass Works, Corning, N.Y., a corporation of New York
Filed Sept. 8, 1966, Ser. No. 577,884
9 Claims. (Cl. 228—1)

This invention relates to a machine for attaching automatically and with precision miniature pillars to the electrodes of miniature transistor chips.

A process for forming terminals on transistor chips, which terminals are in the nature of upstanding pillars, is disclosed in copending application Ser. No. 415,296, titled "Semiconductor Terminals and Method," filed Dec. 2, 1964, now Patent No. 3,333,026 and assigned to the assignee of this invention. In this process, a metallic sheet of foil is placed over a single transistor chip or the like having contact plates thereon and a vibratory energy tool with the desired tip shape cuts a pillar from the sheet of foil and simultaneously welds said pillar to the contact plate on the transistor chip.

The machine of this invention is for automatically practicing the process generally disclosed in the aforesaid application in a precision manner and on production scale.

In this invention, a plurality of transistor chips are scored from a large disc mounted on a glass plate. The metallic foil is positioned over the entire disc of chips on the plate, and the entire assembly is attached to a movable work table. The work table is moved to precise positions in a horizontal plane under numerical biaxial control of its movement. The vibratory energy head is a sonic bonding head which has a stationary position relative to horizontal movements of the work table and transistor chips, but is movable up and down, out of and into contact with the metallic sheet of foil overlying each transistor chip to form the pillars on each chip. The movement of the sonic bonding head is controlled automatically and interlocked with the numerical control for the precise positioning of the work table. After the pillar attaching operation, mechanical means are provided to quickly break contact between the attached pillar and the remainder of the foil sheet. This operation is essential to getting a good bond of the pillar to the chip and to getting the pillar to separate well from the sheet of foil. The sonic bonding head is raised and lowered under automatic electric controls which are interlocked with the other machine controls.

Other features of the invention will be pointed out in the following description and claims and illustrated in the accompanying drawings, which disclose, by way of example, the principle of the invention and the best mode which has been contemplated of applying that principle.

In the drawings:

FIGURE 2 is a side elevation view of a pillar attaching station with some components shown in section for the sake of clarity;

FIGURE 3 is an exploded perspective view of a transistor disc support and foil holder;

FIGURE 4 is a sectional view taken through the disc and foil holder;

FIGURE 5 is an enlarged perspective view of one type of transistor chip with the pillars attached thereto as produced by the machine of this invention;

FIGURE 9 is an electrical circuit diagram for the control circuits of this machine.

Figure 1:
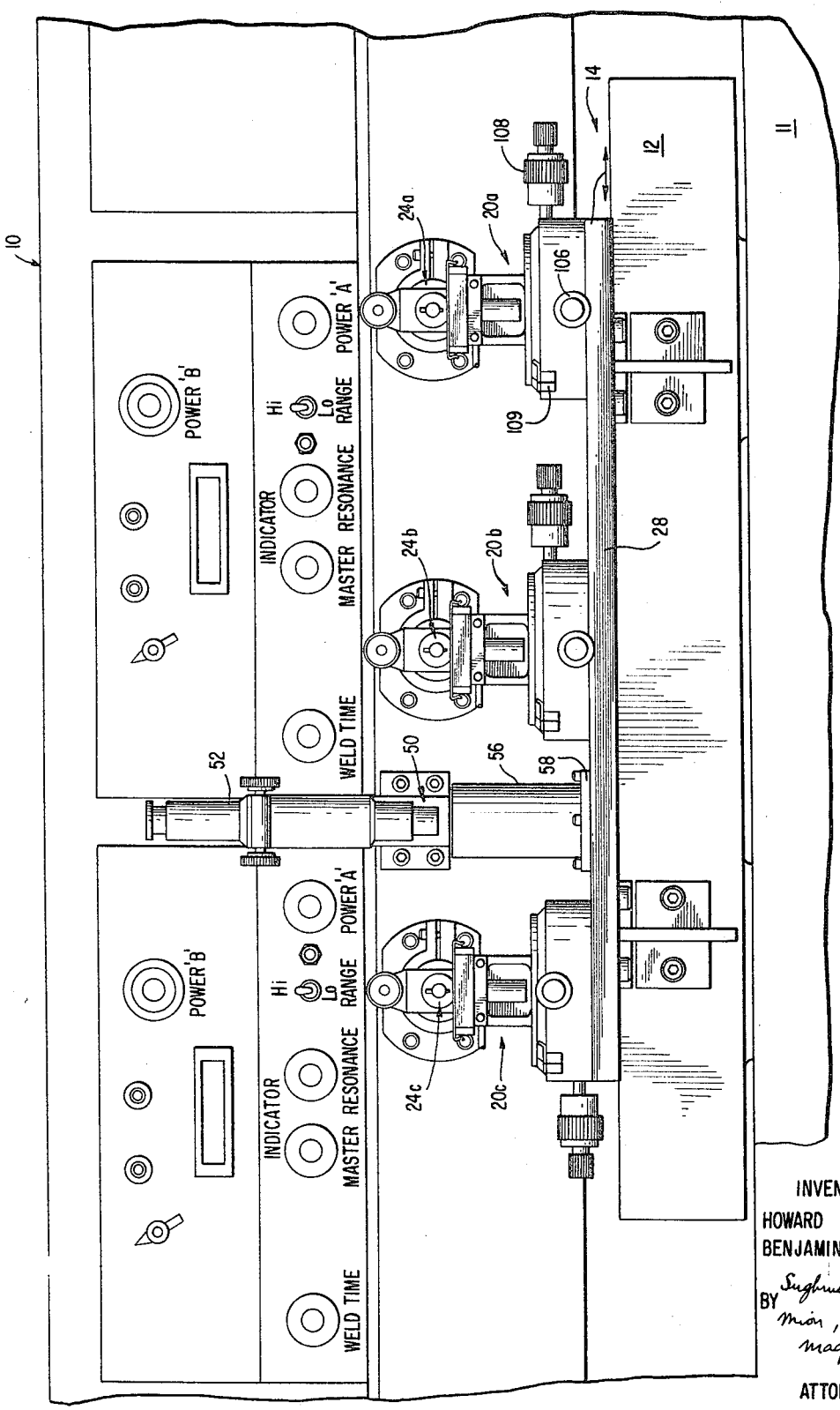
FIGURE 1 is a front elevation of the pillar attaching machine of this invention showing three pillar attaching stations, and one microscopic alignment station.

A machine 10 for automatically attaching pillars to the electrodes of miniature transistor chips is shown in FIGURE 1. The machine includes a base 11 mounting a movable work table assembly 12 thereon. A drive motor 16, FIGURE 9, is connected by conventional means to drive the work table 14 in biaxial directions, that is, in the $x$ and $y$ axes, under the control of a commercially available numerical control unit 18. In this manner, a program tape within the numerical control 18 can cause signals to be sent to the motor 16 to position the work table assembly 14 in any precise position in a horizontal plane.

The work table 14 carries three transistor chip support assemblies 20a, 20b and 20c which are shown in FIGURE 1. Since these assemblies are identical only one will be described in detail. Each transistor support assembly 20, as shown in FIGURE 3, includes a sheet holder assembly 22 for holding a sheet S of suitable material, such as aluminum foil, from which the pillars are made as described in the aforesaid application, over the top of a disc D having a plurality of transistor chips C formed thereon. An enlarged view of a chip C is shown in FIGURE 5 with the pillars T secured thereto.

A sonic bonding head 24, FIGURES 1 and 2, is supported from the machine base 11 for generally vertical movement into and out of contact with the top of sheet S overlying the disc D. A precisely predetermined point on one of the transistor chips C is aligned with the head 24 so that a pillar is cut from the sheet S and affixed to the electrode of chip C as described in the aforesaid application. The sonic bonding head 24 includes a head drive means or assembly 26, FIGURE 2, for moving the welding head into and out of contact with the sheet S overlying the wafer D of chips C.

Electrical control, as shown in FIGURE 9, serves to interlock the operation of movement of the bonding head with the application of bonding energy to the head and the movement of the work table assembly under control of the numerical control 18.

Work table

Figure 6:
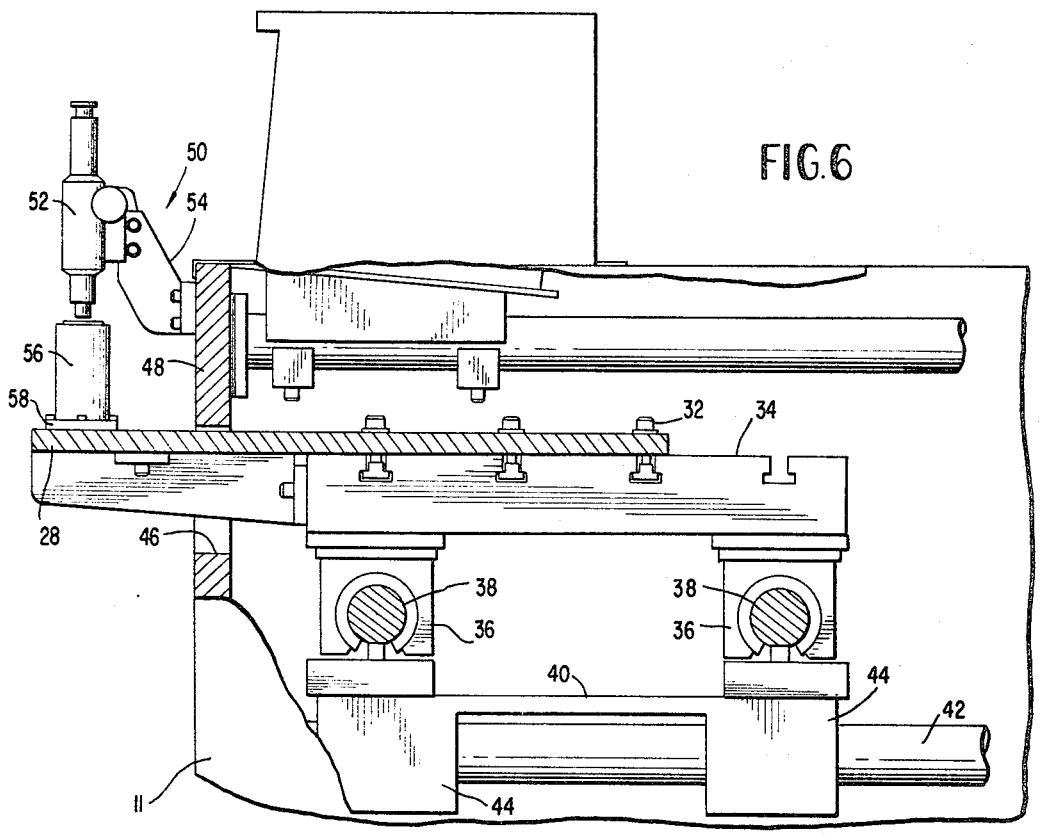
FIGURE 6 is a side elevation view of the microscopic alignment station and support table.

The work table assembly 14 includes a work supporting ledge 28, FIGURE 2, having suitable holes 30 therein for supporting the transistor chip support assemblies 20a, 20b and 20c. Screws 32, FIGURE 6, secure the work support ledge 28 to an upper table shelf 34. Nuts 36 extending from the lower side of upper table 34 are engaged with screws 38 extending longitudinally of the front of the machine. By rotating screws 38 the work table is moved laterally with regard to the front of the machine. The screws 38 are supported upon a lower table shelf 40 which in turn is moved by drive screws 42 cooperating with a pair of nuts 44 depending from shelf 40. By rotating screws 32 by the drive means 16, the work table 14 can be moved in a direction transverse to the movement of table 34. The work table assembly, capable of longitudinal and transverse movement, and the drive motor 16 therefor, are commercially available equipment and, therefore, detailed descriptions need not be given.

The work support ledge 28 extends outwardly of the machine through opening 46 in front wall 48 of base 11 so that it may move relative to the stationary machine.

Alignment station

In order to align the work relative to the work table, an alignment station 50 is provided, see FIGURE 1. This alignment station includes a microscope 52 mounted on bracket 54, FIGURE 6, which is supported from machine base 11. The microscope is of a conventional type and is positioned above a work inspection support 56 mounted by bolting flange 58 to the work support ledge 28. The work inspection support 56 can thus be aligned under the microscope 52 to align the entire work support ledge and individual transistor chip support assemblies can be moved under the microscope for inspection of the pillars applied to the transistor chips.

Bonding head and operator

The sonic bonding head 24 may be of a type commercially available and includes a bonding tip 60 to which sonic energy is applied by a transducer unit 62. The entire assembly is mounted on pivot 64 for movement up and down as shown by the arrow adjacent the tip in FIGURE 2. The controls for the transducer unit 62 are contained in housing 66. A bracket 68 secured to the front 48 of the machine base 12 serves to support the pivot 64. An operating arm 70 is secured to the bonding head 24 and is movable therewith about pivot 64. A weight 72 adjustably threaded on screw mounting 74 at the end of arm 70 provides a biasing means for biasing the bonding tip 60 into contact with sheet S by biasing the operating arm 70 counterclockwise about pivot 64 as shown in FIGURE 2. The other end of operating arm 70 carries an adjustable screw 76 having a cam follower tip 78 for engagement with a face cam 80 driven by shaft 82 from motor 84. It can be seen that the face cam 80 operating on cam follower 78 controls the pivotal movement of operating arm 70 and hence the movement of sonic bonding tip 60 into and out of contact with the metallic sheet S overlying the disc D of transistor chips C which in turn is mounted on a glass plate P.

Transistor support assembly

Referring to FIGURES 3 and 4, the transistor support assembly 20 includes a support block 86 having vacuum passages 88 therein connected to upwardly extending vacuum passages 90 and provided with an external vacuum connection 92 for applying vacuum to hold down plate P, see FIGURE 4. The plate P is positioned on top of a perforated support plate 94 and is precisely aligned by means of locator pins 96a, 96b and 96c, FIGURE 3. Screws 98 extending through flange 100 secure the transistor support assembly to a larger support base 102, which in turn has a downwardly extending boss 104 for engaging in opening 30 in support ledge 28, see FIGURE 2. The transistor support assembly is adjustable in both the x and y directions, as well as rotatably about a z axis. The adjustment in the x direction is provided by micrometer adjusting screw 106, the adjustment in the y direction by a similar adjustment screw 108, see FIGURES 1 and 2, and the device may also be adjusted angularly, that is, a θ adjustment may be made if required by setting alignment lines 109.

Referring to FIGURE 3, the sheet S is held under a foil clip 110 having clip edges 112 and a central opening or window 114. A foil holder 116 includes opposite clip holder edges 118 for engaging the clip edges 112 and includes a pivot rod 120 on one side thereof for engaging in pivot rod brackets 122 having grooves 124 for the rod 120, see FIGURE 3. A thick side edge 126 of foil holder 116 is positioned on top of ledge 128 attached to support block 86 by screws 130. A solenoid 132 screwed into ledge 128 by screw threads 134 includes a solenoid armature rod 136 which, when the solenoid is energized, engages the underside of thick edge 126 positioned thereon and quickly pivots the entire foil holder about pivot rod 120. This quick pivotal action is accomplished when the bonding tip 60 is out of contact with the foil sheet S but after a pillar has been formed on an electrode. With this quick movement of the foil sheet upwardly away from the transistor chip C which is held down by vacuum applied through connection 92, the connections between the main sheet of foil S and the edges of the pillar T attached to the electrode E are quickly and efficiently broken.

Electrical controls and operation

Figure 7:
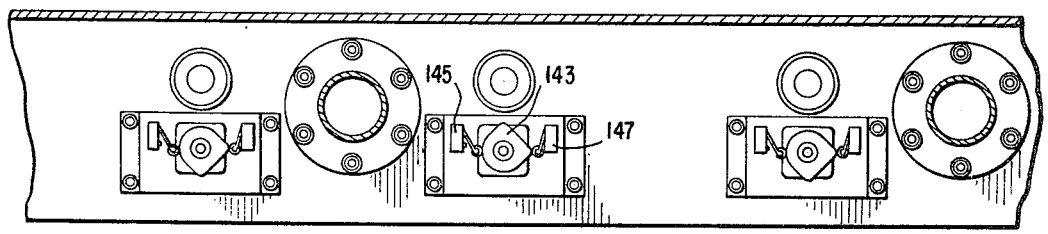
FIGURE 7 is a rear elevation view showing the reverse side of the control panel with safety interlock switches.
Figure 8:
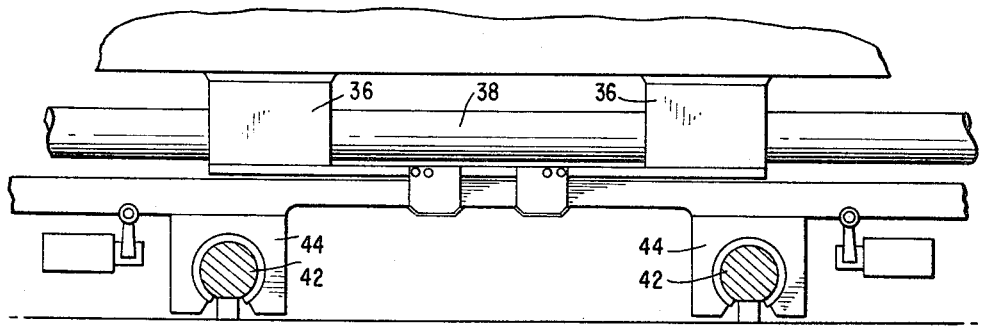
FIGURE 8 is an elevation view of the support table for providing biaxial drive.

The electrical controls are shown primarily in FIGURE 9 with reference to the other figures of the drawings. These controls include a start relay coil 138 having relay contacts 140 for applying conventional 115 volt A.C. power to the machine under the control of the numerical control through conductor 142. An SCR 144 controls a start weld relay coil 146 when a start weld signal is received from a weld electrode of the numerical control. Energization of relay coil 146 controls relay contacts 148, and switches from the position shown. The switching of relay blade 148a will apply to 115 volt A.C. through a conductor 150 to one side of the step drive motor 84. This motor is the motor which drives the face cam 143, FIGURE 7, and also controls cam switches 145 and 147. Switch 145 assures that no welding is accomplished until bonding head 60 is down and switch 147 assures that the table will not index until the bonding head is up. All three controls for the three welding units are interlocked so that no welding takes place until they are all down. The welding stations A, B and C are interlocked through the conductor 149. Movement of switch 145 from the position shown to the other position will start the welding cycle. After welding a time delay in the welder, the switch 156 is shifted to fire SCR 158 and energize stop welding relay 162 to switch the points 164 thereof. Switching the relay points 164 from the position shown will apply the 115 volt A.C. to the other side of step motor 84 driving the cam 143 back to the original position with the welding head raised. When cam 143 returns to its original position, the contacts 147 will be returned to the position shown in FIGURE 9 to complete a circuit through conductors 151 to energize the relay 170 to energize the solenoids to shift the foil holders and separate the attached pillars from the remainder of the foil sheet. After a predetermined time delay, the relay 172 is energized to shift its contacts, thereby deenergizing relay 170. During the time the relay 170 was energized, its contact 171 was closed to send a signal from the numerical control to the drive unit 16 to cause the indexing of the table to take place.

Thus, it is obvious that all the bonding heads must be moved into engagement with the foil and each switch 145 must be closed before the welding units are operated. After a predetermined bonding period, all the bonding heads will be raised until switches 147 are all closed, whereupon the severing operation with respect to the foil and the indexing operation are initiated.

While the invention has been particularly shown and described with reference to a preferred embodiment thereof, it will be understood by those skilled in the art that various changes in form and details may be made therein without departing from the spirit and scope of the invention.

What is claimed is:

1. A machine for attaching a terminal to a metallic contact surface of a miniature transistor chip, the machine including: a machine base, means mounting a work table for movement on the base in x and y directions in a horizontal plane, means for driving the work table in the x and y directions, numerical control means for controlling the driving means, a transistor chip work support means adjustably attached to the work table for carrying a plurality of transistor chips, the improvements comprising, a thin metallic sheet holder on the work support for holding a metallic sheet on top of the transistor chips, a sonic bonding head supported from the machine base for movement into and out of bonding contact with the metallic sheet overlying the transistor chip, means for moving said head into and out of contact with said sheet, and electrical interlocking controls controlling the movement of the welding head, the application of welding energy to the head and the movement of the work support under the numerical control.

2. A machine as defined in claim 1 further comprising means for separating the foil bonded to the top of the transistor chips from the remaining foil in a rapid manner subsequent to each bonding operation after the welder is withdrawn from contact with the foil.

3. A machine as defined in claim 2 wherein the separating means includes a pivotally mounted foil holder and a solenoid mounted on the transistor chip work support for contacting and pivoting the foil holder.

4. A machine as defined in claim 1 wherein a plurality of chip work support means are adjustably attached to said work table and a sonic head is provided for each support means.

5. A machine as defined in claim 4 wherein said electrical interlocking controls include means preventing operation of said bonding heads until all of said bonding heads are moved downwardly into bonding position.

6. A machine as defined in claim 5 wherein said bonding heads are provided time delay means adapted to provide a signal to terminate the bonding operation and initiate movement of said bonding heads to their non-bonding positions.

7. A machine as defined in claim 6 further comprising means for preventing operation of said indexing means until all of said bonding means have been returned to their non-bonding positions.

8. A machine as defined in claim 1 including alignment means comprising microscopic means mounted on said machine base and adapted to be aligned with work inspection support means mounted on said work table.

9. A machine as defined in claim 1 wherein said transistor chip work support means is provided with vacuum hold-down means to hold said transistor chip in place on said work support means.

References Cited
UNITED STATES PATENTS 3,330,026   7/1967   Best et al. _____ 228—1

RICHARD H. EANES, JR., *Primary Examiner.*